US011886135B2

(12) United States Patent

Takashima et al.

(10) Patent No.: US 11,886,135 B2

(45) Date of Patent: Jan. 30, 2024

(54) CONSTANT LUBRICANT APPLICATION

(71) Applicant: HEWLETT-PACKARD DEVELOPMENT COMPANY, L.P., Spring, TX (US)

(72) Inventors: Koichiro Takashima, Yokohama (JP); Yasuyuki Ishii, Yokohama (JP); Yoichi Yoshida, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/922,212

(22) PCT Filed: Jun. 15, 2021

(86) PCT No.: PCT/US2021/037361

§ 371 (c)(1),
(2) Date: Oct. 28, 2022

(87) PCT Pub. No.: WO2022/005736

PCT Pub. Date: Jan. 6, 2022

(65) Prior Publication Data

US 2023/0168611 A1 Jun. 1, 2023

(30) Foreign Application Priority Data

Jun. 30, 2020 (JP) ................................ 2020-112902

(51) Int. Cl.
*G03G 15/20* (2006.01)
*G03G 15/08* (2006.01)
*G03G 21/00* (2006.01)

(52) U.S. Cl.
CPC ..... *G03G 15/2025* (2013.01); *G03G 15/0812* (2013.01); *G03G 21/0094* (2013.01)

(58) Field of Classification Search
CPC .......... G03G 15/0812; G03G 15/2025; G03G 21/007; G03G 21/0094
See application file for complete search history.

(56) References Cited

U.S. PATENT DOCUMENTS 8,953,993 B2 2/2015 Tokuda et al.
2006/0177239 A1 8/2006 Koike et al.
(Continued)

FOREIGN PATENT DOCUMENTS

JP 09-062142 A 3/1997
JP 2002-268397 A 9/2002
(Continued)

*Primary Examiner* — Hoang X Ngo
(74) *Attorney, Agent, or Firm* — Foley & Lardner LLP

(57) ABSTRACT

An example lubricant applying device includes a rotatable applicator, a solid lubricant source to supply lubricant to the applicator, an urging member to urge the lubricant source to contact the applicator, and a guide member to restrict an urging of the lubricant source along a displacement direction. In a transverse cross section of the lubricant applying device that is taken orthogonally to a rotation axis of the applicator, a reference line extends from a contact surface of the lubricant source to the rotation axis of the applicator, in a direction parallel to the displacement direction of the guide member. In the transverse cross section, the lubricant source has a width that is substantially orthogonal to the displacement direction. The lubricant source is positioned to offset a widthwise center of the lubricant source to a downstream side of the reference line, in the rotational direction of the applicator.

14 Claims, 14 Drawing Sheets

(56) References Cited

U.S. PATENT DOCUMENTS

| | | | | |
|---|---|---|---|---|
| 2007/0183824 | A1* | 8/2007 | Suda | G03G 21/0011 399/346 |
| 2016/0139555 | A1 | 5/2016 | Honjoh et al. | |
| 2018/0143580 | A1 | 5/2018 | Aoki | |
| 2021/0124302 | A1 | 4/2021 | Takashima et al. | |

FOREIGN PATENT DOCUMENTS

| | | | |
|---|---|---|---|
| JP | 2004-309940 | A | 11/2004 |
| JP | 2007-187845 | A | 7/2007 |
| JP | 2009-092710 | A | 4/2009 |
| JP | 2009-175407 | A | 8/2009 |
| JP | 5073418 | B2 | 11/2012 |
| JP | 2018-081274 | A | 5/2018 |
| JP | 2020-016701 | A | 1/2020 |

* cited by examiner

CONSTANT LUBRICANT APPLICATION

BACKGROUND

In electrophotographic image forming apparatuses, toner adheres to an image carrier on which a latent image is formed, a resulting toner image is transferred to paper, and the toner image is fixed to the paper. The image carrier may be a photosensitive drum, an intermediate transfer belt or the like. For protection of, and reduction in friction on the image carrier, lubricant is applied to a surface of the image carrier. A device to apply the lubricant may be referred to as a lubricant applying device. In some image forming apparatuses, a lubricant consumption rate of the lubricant applying device may be unstable over the lifespan of the lubricant source.

DETAILED DESCRIPTION

Figure 1:
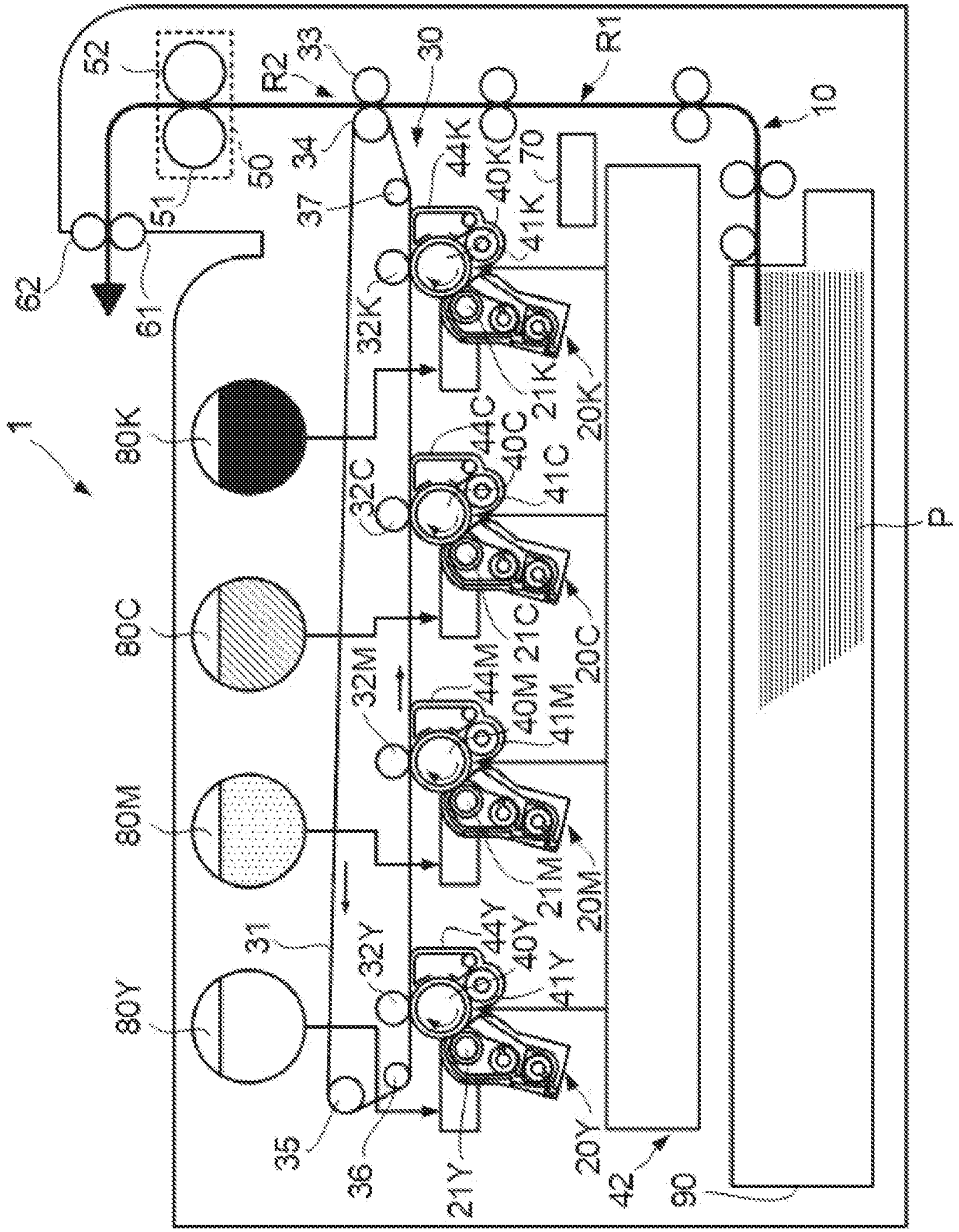
FIG. 1 is a schematic diagram of an image forming apparatus according to one example.

The present disclosure will be best understood from the following detailed description when it is read together with the accompanying drawings. The same or similar reference numerals in different drawings denote the same or similar features or components, and redundant explanations related to such features or components are omitted. The terms "above," "below," "right" and "left" indicate the directions in relation to the drawings views and are not necessarily identical to directions at the time of actual use of a device. Feature or components are not necessarily illustrated to scale, and sometimes, a portion thereof is emphasized in order to illustrate an operation, effect and the like of the present disclosure.

Additionally, an "upstream side" or a "downstream side" may refer to an upstream or downstream location with respect to the direction of rotation of a rotatable applicator at a location of the applicator facing a lubricant source. For example, the upstream side may refer to an upstream side, in the direction of rotation of the applicator, relative to a line extending through a rotation axis of the applicator in a direction parallel to a facing direction in which the lubricant source faces the applicator.

Referring to FIG. 1, an example image forming apparatus 1 can form a color image using each color of yellow (Y), magenta (M), cyan (C) and black (K). The image forming apparatus 1 can be provided with a recording medium conveyance unit 10 conveying paper P, developer devices 20Y, 20M, 20C and 20K developing electrostatic latent images, a transfer unit 30 secondarily transferring a toner image to the paper P, photosensitive drums 40Y, 40M, 40C and 40K which are electrostatic latent image carriers on the circumferential surfaces of which the electrostatic latent images are formed, and a fixing unit 50 fixing the toner image to the paper P. The letters Y, M, C and K following the respective reference numerals indicate that the components are for yellow, magenta, cyan and black, respectively. When the components do not need to be distinguished by colors, Y, M, C and K following the respective reference numerals may be omitted for ease of reading and understanding, and they may be referred to as the developer device 20 and the photosensitive drum 40. Similarly, also for a developer roller 21, a primary transfer roller 32, a charging roller 41 and a cleaning unit 44 described later, Y, M, C and K following the respective reference numerals may be omitted.

The recording medium conveyance unit 10 can convey, on a conveyance path R1, the paper P as a recording medium on which an image is formed. The paper P may be stacked and stored in a cassette 90. The recording medium conveyance unit 10 can allow the paper P to reach a secondary transfer region R2 through the conveyance path R1 at a timing when the toner image to be transferred to the paper P reaches the secondary transfer region R2.

Four developer devices 20 may be provided, in association with the respective four colors of yellow, magenta, cyan and black, for example. Each developer device 20 can be provided with a developer roller 21 which transfer the toner to the photosensitive drum 40. Each developer device 20 may adjust the toner and carrier to be at a targeted mixing ratio and further mix and stir the toner and carrier to disperse the toner, so as to form a developer having an optimal (or targeted) charge amount. This developer may be carried on the developer roller 21. As the developer roller 21 rotates, the developer is conveyed to a region where the developer faces the photosensitive drum 40, and where the toner of the developer transfers to an electrostatic latent image formed on the circumferential surface of the photosensitive drum 40, so as to develop the electrostatic latent image.

The transfer unit 30 can convey the toner image formed in the developer device 20 to the secondary transfer region R2 in which the toner image is secondarily transferred to the paper P. The transfer unit 30 may include a transfer belt 31, suspension rollers 34, 35, 36 and 37 suspending (or supporting) the transfer belt 31, the primary transfer rollers 32 positioned so as to hold the transfer belt 31 together with the photosensitive drums 40, and a secondary transfer roller 33 positioned so as to hold the transfer belt 31 together with the suspension roller 34.

The transfer belt 31 can be an endless belt that is rotated by the suspension rollers 34, 35, 36 and 37. The primary transfer rollers 32 may each be disposed to press against the photosensitive drums 40, from the inner circumferential side of the transfer belt 31. The secondary transfer roller 33 may be disposed to press against the suspension roller 34, from the outer circumferential side of the transfer belt 31.

Four photosensitive drums 40 may be provided, in association with the respective four colors of yellow, magenta, cyan and black. The photosensitive drums 40 may be arranged along a moving direction of the transfer belt 31. On the circumference of the photosensitive drum 40, the developer device 20, the charging roller 41, an exposure unit 42 and the cleaning unit 44 may be provided.

The charging roller 41 may charge the surface of the photosensitive drum 40 to a predetermined potential. The charging roller 41 can rotate so as to follow a rotation of the photosensitive drum 40. The exposure unit 42 may expose the surface of the photosensitive drum 40 having been previously charged by the charging roller 41, according to an image to be formed on the paper P. Accordingly, the potential of a portion of the surface of the photosensitive drum 40 having been exposed, may change, so as to form an electrostatic latent image. The developer device 20 develops the electrostatic latent image on the photosensitive drum 40 with toner supplied from a corresponding one of toner tanks 80Y, 80M, 80C and 80K, which is disposed in alignment with the developer device 20, so as to generate a toner image. The toner tanks 80Y, 80M, 80C and 80K are filled with yellow, magenta, cyan and black toners, respectively. The cleaning unit 44 collects toner which remains on the photosensitive drum 40 after the toner image on the photosensitive drum 40 is primarily transferred to the transfer belt 31. In some examples, the photosensitive drum 40 and the charging roller 41 are installed in a housing which forms the cleaning unit 44. Namely, the cleaning unit 44, the photosensitive drum 40 and the charging roller 41 are formed into a unit.

The fixing unit 50 may fix the toner image to the paper P. The fixing unit 50 may be provided with a heater roller 51 heating the paper P and a pressure roller 52 pressing the heater roller 51. The heater roller 51 and the pressure roller 52 are formed in a cylindrical shape, and the heater roller 51 may be provided therein with a heat source such as a halogen lamp. A fixing nip, which is a contact region, is formed between the heater roller 51 and the pressure roller 52. The paper P is conveyed through the fixing nip so as to fuse and fix the toner image to the paper P.

In addition, the image forming apparatus 1 may be provided with discharge rollers 61 and 62 to discharge, to the outside of the apparatus, the paper P onto which the toner image has been fixed.

A printing process carried out by the image forming apparatus 1 will be described. When an image signal of an image to be recorded is input to the image forming apparatus 1, a controller 70 of the image forming apparatus 1 causes, based on the received image signal, the charging rollers 41 to charge the surfaces of the photosensitive drums 40 to a predetermined potential in a charging operation, and subsequently, the exposure units 42 emit a laser light to the surfaces of respectively the photosensitive drums 40 to form the respective electrostatic latent images in an exposing operation.

The developer devices 20 develop the electrostatic latent images, respectively, to form toner images in a developing operation. The respective toner images formed in this manner are primarily transferred from the respective photosensitive drums 40 to the transfer belt 31 in a transferring operation. The toner images formed on the photosensitive drums 40 may be overlaid (or superposed or layered) one over another on the transfer belt 31, to form a single composite toner image. Then, the composite toner image may be secondarily transferred to the paper P that is conveyed from the recording medium conveyance unit 10, in the secondary transfer region R2 where the suspension roller 34 and the secondary transfer roller 33 face each other.

The paper P with the composite toner image may be conveyed to the fixing unit 50. The paper P is conveyed to pass through an area between the heater roller 51 and the pressure roller 52 while heated and pressed, and the overlaid toner image is thereby fused and fixed to the paper P in a fixing operation. Subsequently, the paper P may be discharged to the outside of the image forming apparatus 1 via the discharge rollers 61 and 62.

The aforementioned operations of the image forming apparatus 1 and the like may be controlled by the controller 70. The controller 70 may be implemented in the form of machine-readable instructions executable by a processer such as a central processing unit. The machine readable instruction may be stored on any suitable computer readable medium.

Figure 2:
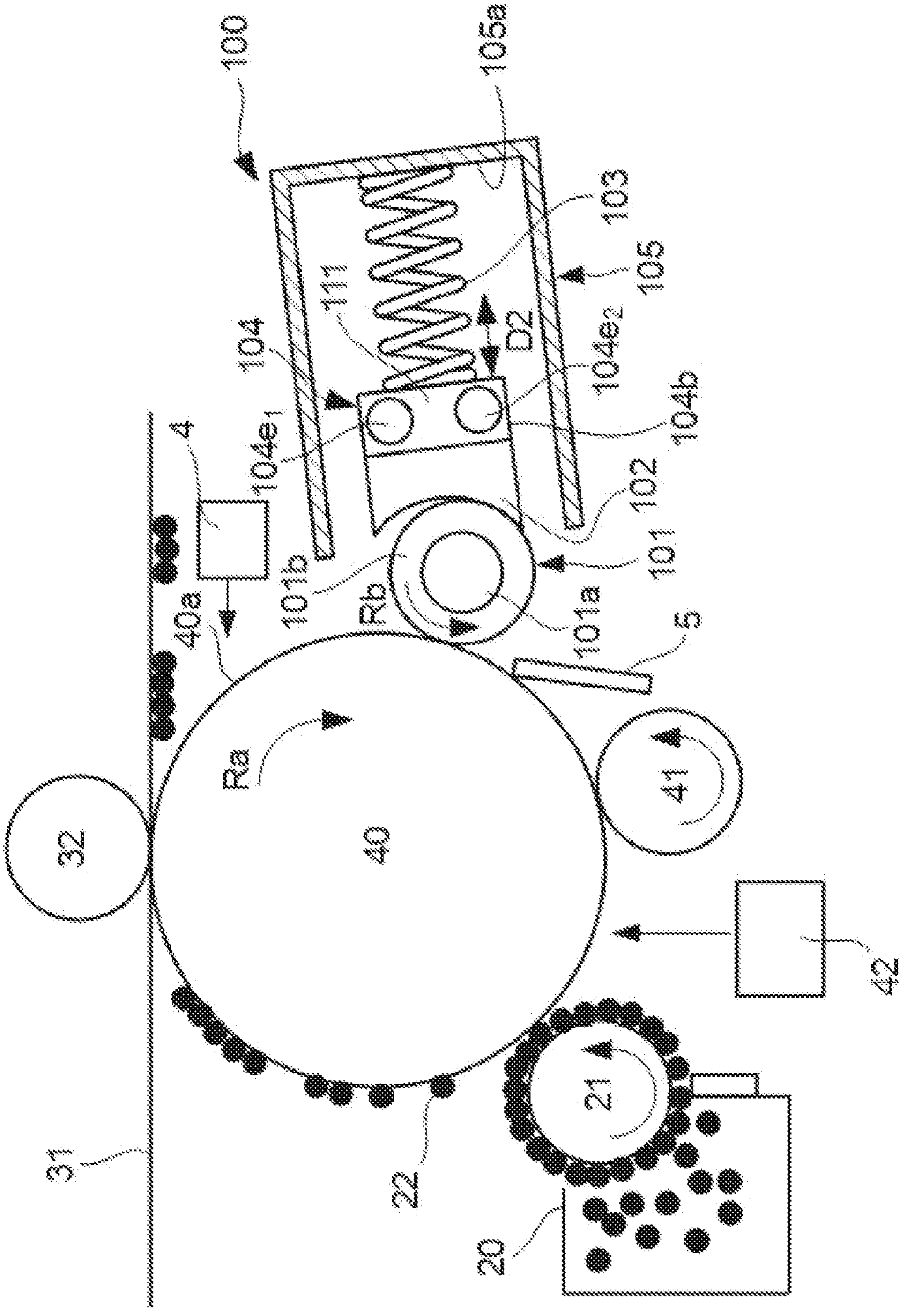
FIG. 2 is a schematic cross-sectional view of a photosensitive drum and a vicinity of the photosensitive drum in the example image forming apparatus.

FIG. 2 is a diagram schematically showing the example photosensitive drum (also referred to as the image carrier or a member to be coated) 40 and its vicinity in the example image forming apparatus 1 shown in FIG. 1. FIG. 2 shows a toner image being formed on the transfer belt 31, from toner which is illustrated schematically as indicated by reference numeral 22.

With reference to FIG. 2, the example image forming apparatus 1 includes the primary transfer roller 32, an eraser 4, a lubricant applying device 100, a cleaning blade 5, the charging roller 41, the exposure unit 42, the developer device 20 and the like along a direction of rotation Ra of the photosensitive drum 40. The eraser 4 applies light to the electrostatic latent image formed on the outer circumferential surface of the photosensitive drum 40, to destaticize the photosensitive drum 40 and erase the image information on the photosensitive drum 40. The charging roller 41 and the exposure unit 42 are described above.

The example lubricant applying device 100 applies lubricant to a surface of the image carrier (e.g., the photosensitive drum 40), in order to facilitate the removal of residual toner from the surface of the image carrier, and to reduce wear of the surface of the image carrier. Residual toner is toner which has not been transferred from the image carrier to the transfer belt 31, and which has remained on the image carrier. The example lubricant application device 100 is configured to increase a stability of a lubricant consumption rate from the start of use of the lubricant until it is exhausted. The example lubricant applying device 100 may include a support member 104 to support a solid lubricant source 102, an urging member 103 to press the lubricant source 102 toward a supply roller (also referred to as an applicator) 101, and a casing 105. The supply roller 101 is located between the eraser 4 and the cleaning blade 5 along the circumference of the photosensitive drum 40. The supply roller 101 removes, from the photosensitive drum 40, and retains (or collects), at least a part of the residual toner which remains on a surface 40*a* of the photosensitive drum 40. In some examples, the lubricant applying device 100 may be disposed in the image forming apparatus 1 as a single unit that is replaceable. In other examples, the supply roller 101, the lubricant source 102, the cleaning blade 5 and the like may be installed in a housing which forms the cleaning unit 44.

The solid lubricant source 102, which is a bar-like component extending along an axial direction of the supply roller 101, may be disposed to contact the supply roller 101. Particularly, the lubricant source 102 may be urged by the urging member 103 to be pressed against the supply roller 101. The supply roller 101 has an elastic body 101*b* (described below) to scrape off the lubricant at a contact region with the lubricant source 102 and to supply the scraped lubricant to the surface 40*a* of the photosensitive drum 40 at a contact region with the photosensitive drum 40. The lubricant source 102 can be made of, for example, zinc stearate, barium stearate, lead stearate or the like. A positional relation of the supply roller 101 and the lubricant source 102 and the like will be further described below.

The supply roller 101 has a rotatable shaft 101*a* and the elastic body 101*b* formed around the shaft 101*a* (e.g., on the circumferential surface of the shaft 101*a*). The two opposite ends of the shaft 101*a* can be rotatably supported by bearing members and may be driven to rotate by a driving device. The supply roller 101 is driven by a rotation of the photosensitive drum 40, to rotate in a direction of rotation Rb. The elastic body 101*b* may be formed of foam (e.g., a foam layer). That is, the elastic body 101*b* can be a sponge-like elastic body. The foam can be, for example, urethane foam or the like. In some examples, the density of the foam may be 48 $kg/m^3$ to 67 $kg/m^3$. In addition, the 25% hardness of the foam may be 185 N to 305 N. The "25% hardness" is a value measured by method D of JIS K 6400-2. The thickness of the elastic body 101*b* can be, for example, 1 mm to 4 mm. For example, when the outer diameter of the supply roller 101 is 10 mm, the thickness of the elastic body 101*b* can be 2 mm. In addition, the elastic body 101*b* can also be formed of, for example, napped fibers instead of the foam. That is, the elastic body 101*b* is a brush-like elastic body. The napped fibers can have flexibility and can be, for example, a polyolefin-based resin (e.g., polyethylene or polypropylene). In some examples, the lubricant applying device 100 may be disposed in the image forming apparatus 1 as a single unit that is replaceable. In other examples, the supply roller 101, the lubricant source 102, the urging member 103, the blade 5 and the like may be installed in a housing which forms the cleaning unit 44.

The cleaning blade 5 is located to abut (or contact) the surface 40*a* of the photosensitive drum 40 so as to scrape off and remove residual toner from the photosensitive drum 40. As mentioned above, the supply roller 101 is located upstream of the cleaning blade 5 in the direction of rotation Ra of the photosensitive drum 40. The cleaning blade 5 scrapes off and removes residual toner not carried by the supply roller 101 on the surface of the photosensitive drum 40, thereby cleaning the surface 40*a* of the photosensitive drum 40. Since the cleaning blade 5 reliably removes the residual toner, the photosensitive drum 40 can properly form a next electrostatic latent image on its surface 40*a* and perform the transfer or the like.

Figure 3:
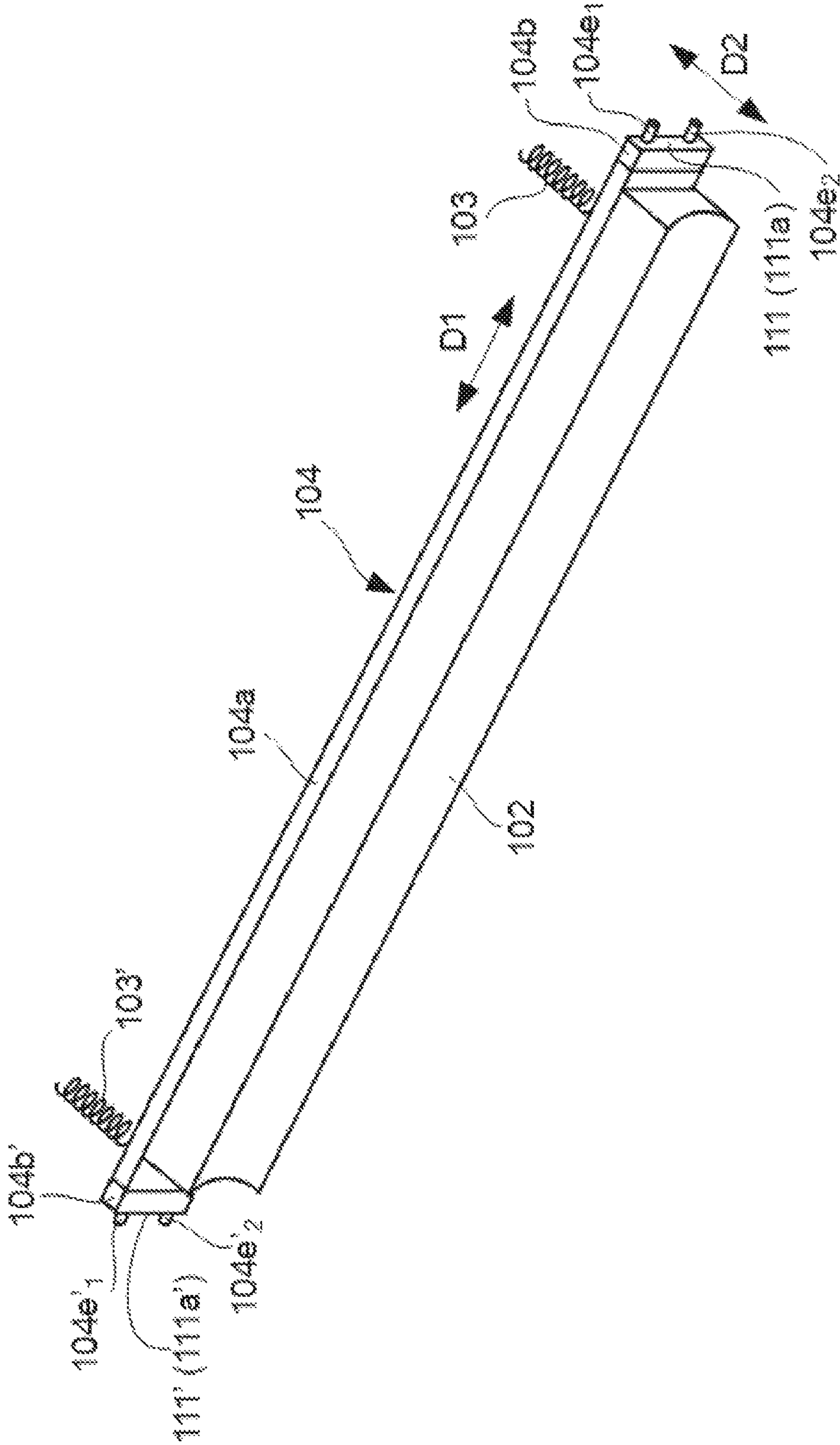
FIG. 3 is a schematic perspective view of an example lubricant applying device shown in FIG. 2.

FIG. 3 is a perspective view showing an example of the lubricant source 102, the support member 104, and the urging members 103 and 103' (also referred to herein as the urging member 103 for when describing one of the urging members). For example, the support member 104 is disposed at a position to support the lubricant source 102 between the support member 104 and the supply roller 101. In that case, the support member 104 is disposed on the opposite side of the supply roller 101 relative to the lubricant source 102. The support member 104 is located, for example, between the urging member 103 and the supply roller 101. As one example, the support member 104 includes a lubricant sheet metal 104*a* to which the lubricant source 102 is fixed and guide members 104*b* and 104*b*' (also referred to herein as the guide member 104*b* for when describing one of the guide members) restricting a moving direction of the lubricant sheet metal 104*a*. While the guide member 104*b* and the lubricant sheet metal 104*a* are, for example, shown as separate units, they may also be formed as a single unit. As one example, the lubricant sheet metal 104*a* extends along the length of the lubricant source 102. For example, the longitudinal direction of the lubricant source 102 conforms to a direction D1 which is the longitudinal direction of the lubricant sheet metal 104*a*.

The urging members 103 and 103' are located, for example, side by side along the direction D1. According to examples, the urging members 103 and 103' may be provided at opposite ends of the support member 104 so as to be spaced apart in the direction D1. For example, the urging members 103 and 103' may be located at equal distances to the center of the support member 104 in the direction D1.

Figure 4:
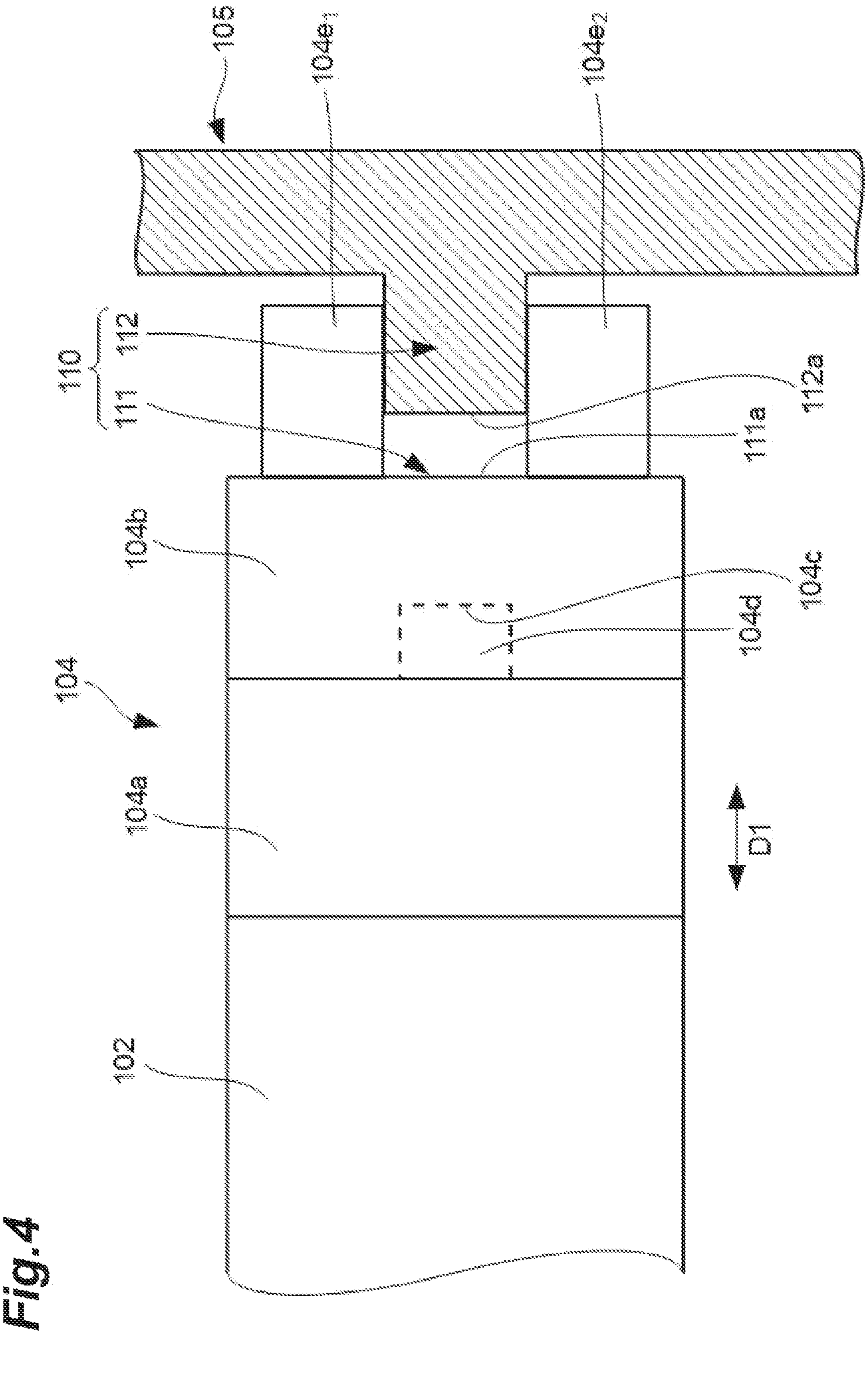
FIG. 4 is a partial cross-sectional view of the example lubricant applying device of FIG. 2, as viewed from a supply roller illustrated in FIG. 2.

FIG. 4 is a partial cross-sectional view showing the lubricant sheet metal 104*a*, the guide member 104*b* and the casing 105. With reference FIGS. 2 to 4, the guide members 104*b* and 104*b*' may be provided at opposite ends of the lubricant sheet metal 104*a* in the direction D1. In some examples, the lubricant sheet metal 104*a* has a projection 104*d* fitted into a hole 104*c* formed in the guide member 104*b*. For example, the guide member 104*b* is connected to the lubricant sheet metal 104*a* by fitting the projection 104*d* into the hole 104*c*. The lubricant sheet metal 104*a* may be connected to the guide member 104*b* in other suitable configurations, in other examples.

The casing 105 is, as one example, shaped like a box having an opening and capable of housing the lubricant source 102, the support member 104*a* and the urging member 103. The casing 105 may be, for example, fixed to a housing of a unit including the lubricant applying device 100. The urging member 103 is, as one example, disposed between an inner wall 105*a* facing the opening of the casing 105 and the support member 104, and may press the support member 104 in the direction toward the opening of the casing 105. For example, the urging member 103 can include a compression coil spring, in which one end of the urging member 103 may be fixed to the inner wall 105*a* of the casing 105 and the other end of the urging member 103 may be fixed to the lubricant sheet metal 104*a*.

The lubricant applying device 100 is provided with, for example, a moving mechanism (or movement coupling) 110 including a guide 111 which is connected to the support member 104 and extends along a direction D2 and an engagement portion 112 engaged in the guide 111. The direction D2 represents, for example, the urging direction of the urging member 103, and in other words, a displacement direction of approaching the photosensitive drum 40 or receding from the photosensitive drum 40. As one example, the guides 111 and 111' (also referred to herein as the guide 111 when describing one of the guides) are provided respectively at the opposite ends of the support member 104 in the direction D1.

The guide 111 has, as one example, a concave portion 111*a* formed in the support member 104, and the engagement portion 112 has a convex portion 112*a* protruding from the casing 105 into the concave portion 111*a*. The concave portion 111*a* (111*a*') is provided, for example, between a plurality of projections $\mathbf{104}_{e1}$ ($\mathbf{104}_{e'1}$) and $\mathbf{104}_{e2}$ ($\mathbf{104}_{e'2}$) protruding along the direction D1 in the guide member 104*b*. Each of the plurality of projections $\mathbf{104}_{e1}$ ($\mathbf{104}_{e1}$) and $\mathbf{104}_{e2}$ ($\mathbf{104}_{e'2}$) is, for example, shaped like a column. In other examples, each of the plurality of projections $104_{e1}$ ($104_{e'1}$) and $104_{e2}$ ($104_{e'2}$) may be shaped like a prism and the form thereof can be modified suitably. The convex portion 112*a* is, as one example, shaped like a rectangular prism extending along the direction D2. In other examples, the shapes of the concave portion 111*a* formed in the support member 104 and the convex portion 112*a* of the casing 105 may be interchanged respectively into a convex portion formed in the support member 104 and a concave portion formed in the casing 105.

As mentioned above, the moving mechanism 110 is located between the support member 104 and the casing 105. For example, the moving mechanism 110 includes the concave portion 111*a* of the guide member 104*b* and the convex portion 112*a* of the casing 105. The moving mechanism 110 is coupled to the casing 105, and the urging member 103 is located between the casing 105 and the support member 104. The moving mechanism 110 restricts a moving direction of the lubricant source 102 to the direction D2. A positional relation of the supply roller 101 and the lubricant source 102 and the like are further described below.

As mentioned above, in the lubricant applying device 100, the solid lubricant source 102 is consumed by a rotating motion of the supply roller 101. In some image forming apparatuses, the life of the lubricant from the time of starting using the lubricant source 102 (the initial state of the lubricant source) to the state of having exhausted the lubricant source may be limited. For example, in the lubricant applying device 100, a compression coil spring is used as the urging member 103. The urging force of the compression coil spring tends to reach a maximum in the initial state of the lubricant source and the urging force thereof tends weaken as the lubricant source is consumed and the compression coil spring is stretched. Accordingly, the consumption rate of the lubricant source consumed due to a rotating motion of the supply roller may reach a maximum in the initial state of the lubricant source and may tend to decrease as the lubricant source is consumed. For example, in the case where more lubricant than necessary is applied to the surface 40*a* of the photosensitive drum 40, the coefficient of friction on the surface 40*a* may be reduces such that an amount of toner carried on the surface 40*a* decreases and a defective image called a void image, a wormhole image or the like may be produced as a consequence thereof, and/or a filming phenomenon in which a toner component passing the cleaning blade 5 adheres to the surface 40*a* to form a film, may also occur. Conversely, when the applying amount of the lubricant applied is low, an increase in the friction may cause wear the surface of the photosensitive drum 40, the cleaning blade 5 and the like, deformation of the cleaning blade 5, and/or the like. Accordingly, a substantially constant rate of application from the lubricant source may allow applying a necessary amount of the lubricant to the image carrier (e.g., the photosensitive drum), and also prolong the lifespan of the lubricant source.

Figure 5A:
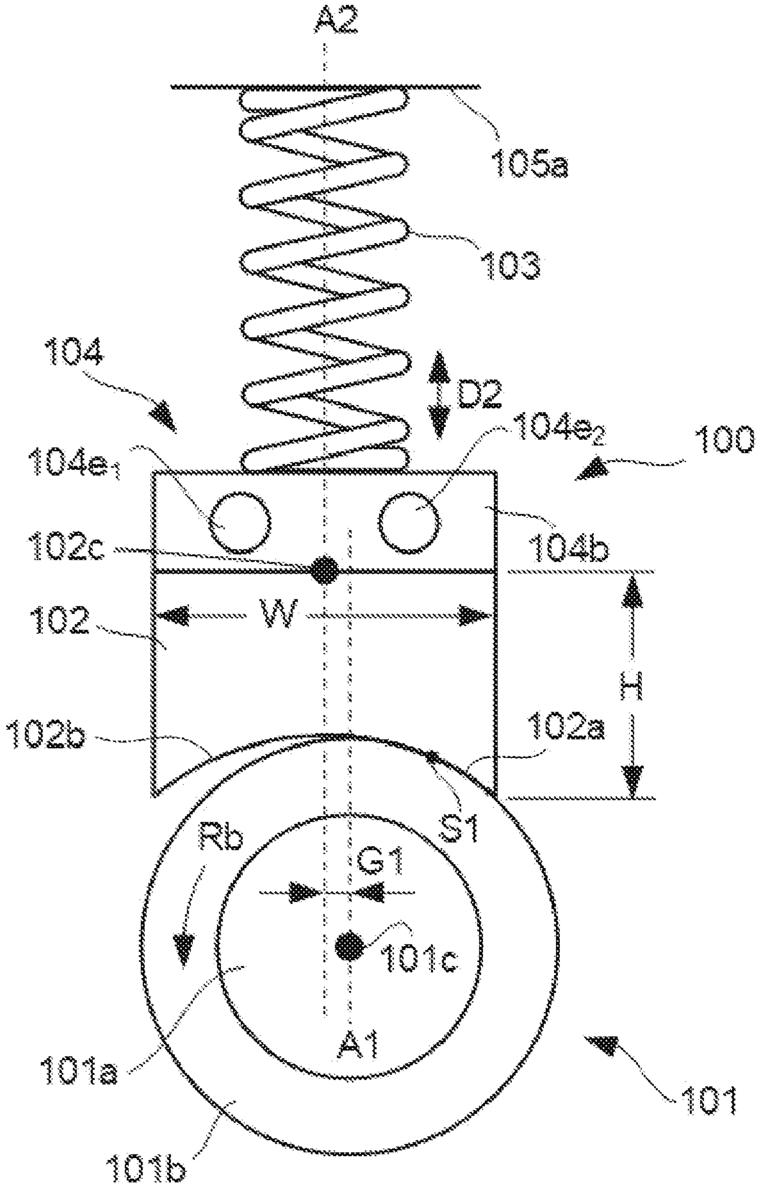
FIG. 5A is a schematic cross-sectional view of the example lubricant applying device of FIG. 2, illustrating an operational state.
Figure 5B:
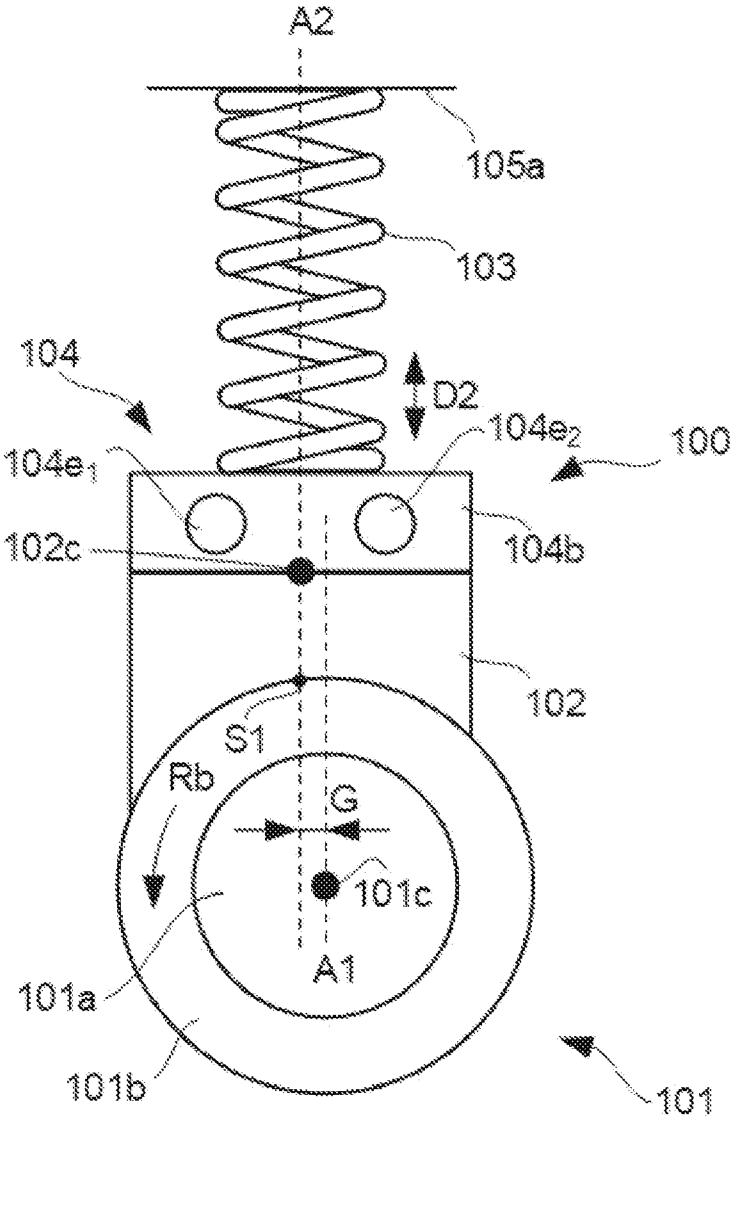
FIG. 5B is a schematic cross-sectional view of the example lubricant applying device of FIG. 2, illustrating another operational state.

FIGS. 5A and 5B illustrates a transverse cross section of the example lubricant applying device 100, taken orthogonally to a rotation axis 101*c* of the shaft 101*a* of the supply roller 101. The casing 105 is omitted from FIGS. 5A and 5B. FIG. 5A shows the initial state of the lubricant source 102, and FIG. 5B shows a state in which the lubricant source 102 is consumed to about a half of the lifespan of the lubricant source 102 due to the rotating motion of the supply roller 101.

Referring to FIGS. 5A and 5B, a positional relationship of the supply roller 101 and the lubricant source 102, will be described. With reference to FIG. 5A, the lubricant source 102 in the initial state includes a first region 102*a* and a second region 102*b* on a side that contacts the supply roller 101. The lubricant source 102 has a width W and a height H, and has a center 102*c* in the direction of the width W The width W of the lubricant source 102 can be about 7 mm to 9 mm. For example, the lubricant source 102 may have a width W of about 8 mm. The height H of the lubricant source 102 can be about 5 mm to about 7 mm. For example, the lubricant source 102 may have a height H of about 6 mm. In this case, the outer diameter of the supply roller 101 can be about 10 mm and the width W of the lubricant source may be less than the outer diameter of the supply roller 101.

As shown in FIGS. 5A and 5B, the support member 104 positions the lubricant source 102 to face the supply roller 101 such that the center 102*c* of the lubricant source 102 is offset to a downstream position, in the direction of rotation Rb of the supply roller 101, relative to a line (an axis line or a reference line) A1 extending parallel to the urging direction D2 of the urging member 103, intersecting the contact surface of the lubricant source 102 and the rotation axis 101*c* of the supply roller 101. In this example, given a line (an axis line) A2 extending parallel to the urging direction (or displacement direction of the guide member) D2 and intersecting the center 102*c* of the lubricant source 102, a distance G between the line A2 and the line A1 can be about 0.5 mm to about 1.5 mm. For example, the distance G can be about 1 mm. In the example, the axis line A2 may also correspond to the position of a central vector (along a central urging axis) that defines the urging force of the coil spring 103. Accordingly, the reference line A1 is located on a downstream side of the urging direction (e.g., central urging axis A2) of the coil spring 103.

With reference to FIG. 5A, the lubricant source 102 is positioned to face the supply roller 101. In the initial state, the lubricant source 102 contacts the supply roller 101 exclusively in the first region 102*a* of the lubricant source 102. In one example, a geometric center of the first region 102*a* is located on an upstream side in the direction of rotation Rb of the supply roller 101, for example, upstream of the line A1. The first region 102*a* and the second region 102*b* can be protruding portions protruding toward the supply roller 101 as shown in FIG. 5A. In the example of FIG. 5A, the geometric center of the first region 102*a* may conform to a geometric center S1 of the contact area of a portion in which the first region 102*a* contacts the supply roller 101, as will be described below. In addition, a contact surface between the lubricant source 102 and the supply roller 101 can include an arcuate surface at least partially conforming to the outer circumference (or the outer circumferential surface) of the supply roller 101. In some examples, the second region 102*b* does not contact the supply roller 101 in the initial state. The second region 102*b* is located downstream of the line A1 in the direction of rotation Rb of the supply roller 101. In addition, the second region 102*b* can include an arcuate surface at least partially conforming to the outer circumference of the supply roller 101. With reference to FIG. 5B, the second region 102*b* contacts the supply roller 101 downstream of the line A1 in the direction of rotation Rb of the supply roller 101 as the lubricant source 102 is consumed. In FIG. 5B, the supply roller 101 contacts both the first region 102*a* and the second region 102*b* of the lubricant source 102. Accordingly, as the lubricant source 102 is consumed, a contact area where the lubricant source contacts the supply roller 101 extends at least partially on the upstream side of the reference line A1 (e.g., the first region 120*a*), relative to the direction of rotation Rb of the supply roller 101.

Figure 5C:
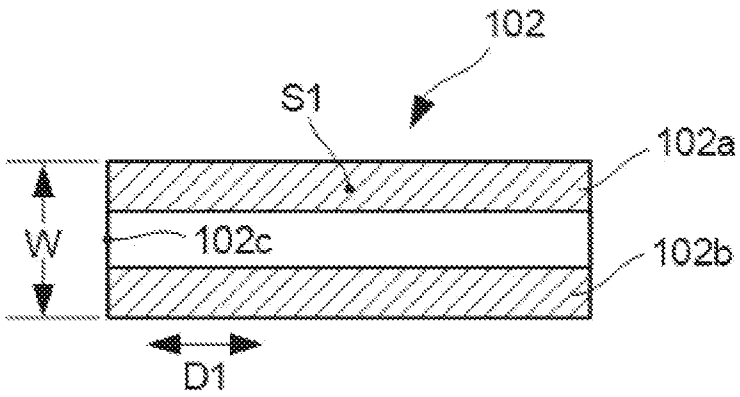
FIG. 5C is a schematic plan view of a lubricant source of the example lubricant applying device of FIG. 2, as viewed from the supply roller illustrated in FIG. 2.

FIG. 5C is a plan view of the lubricant source 102 in the initial state, as viewed from the supply roller 101 side. In FIG. 5C, the geometric center S1 of the contact area of the portion in which the first region 102*a* contacts the supply roller 101 is shown. Since the lubricant source 102 is gradually consumed due to rotation of the supply roller 101, such a contact area also increases accordingly. For example, the lubricant source 102 gradually changes from a state shown in FIG. 5A to a state shown in FIG. 5B. In this case, the geometric center 51 of the contact area moves along the direction of rotation of the supply roller 101. Particularly, as is apparent from FIGS. 5A and 5B, the geometric center 51 moves across the line A1 as the lubricant source 102 is consumed.

Figure 6A:
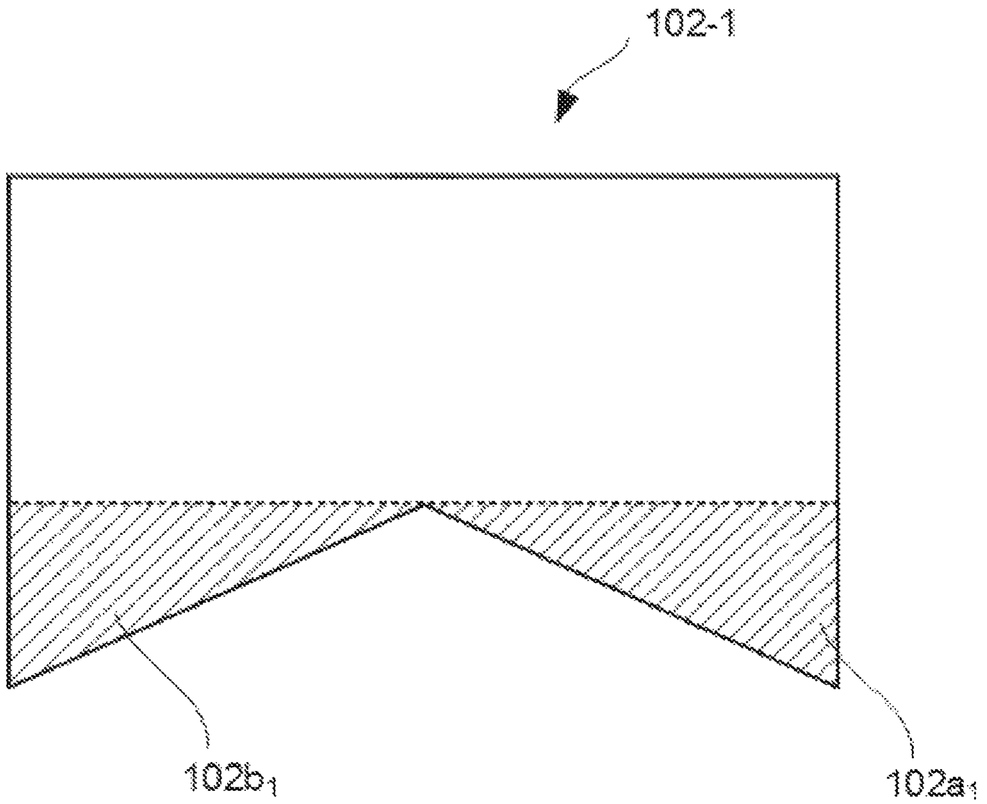
FIG. 6A is a schematic cross-sectional view of another example lubricant source.
Figure 6B:
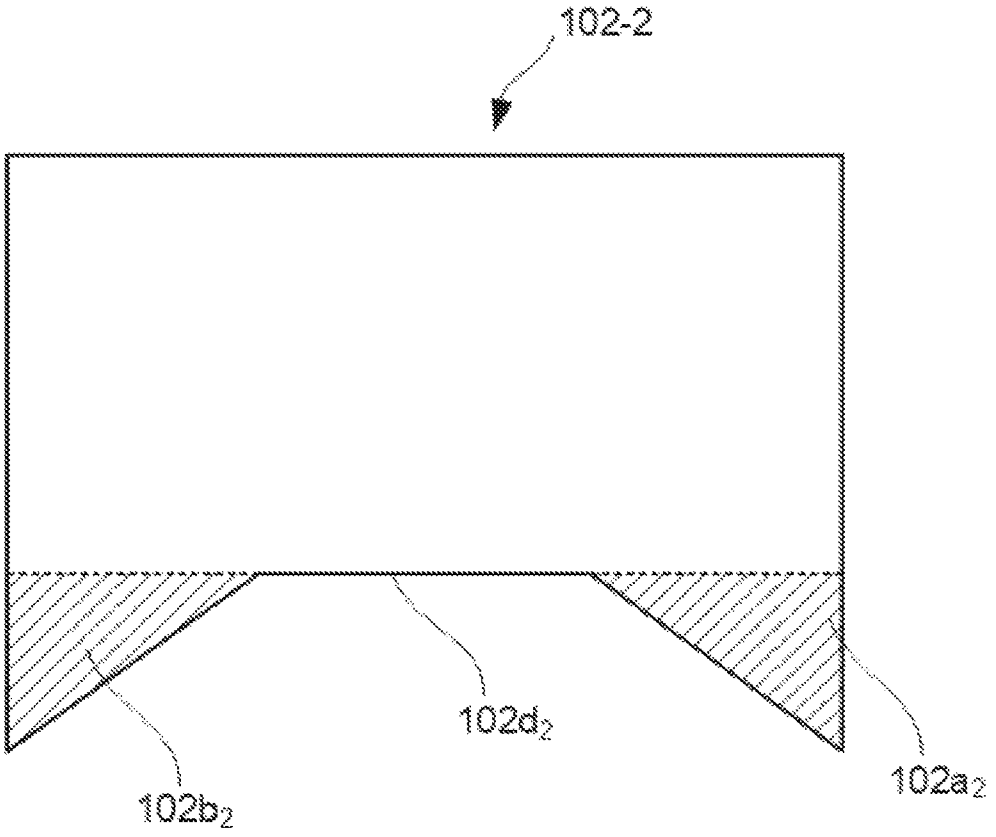
FIG. 6B is a schematic cross-sectional view of another example lubricant source.
Figure 6C:
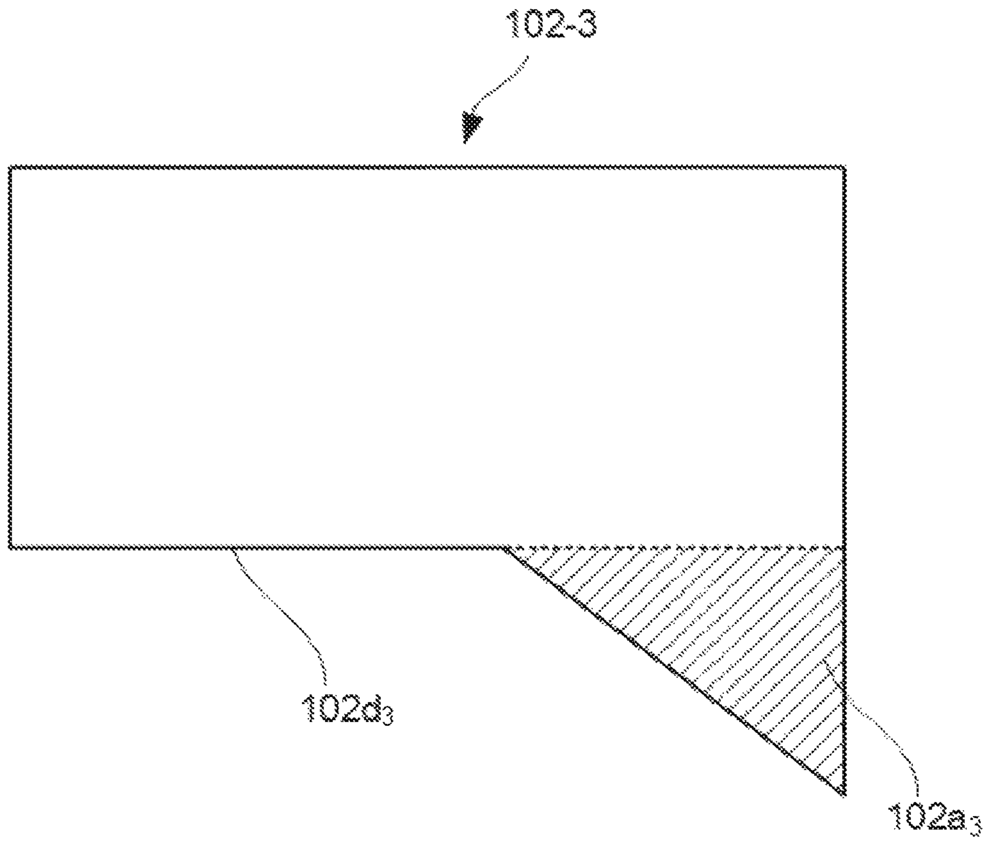
FIG. 6C is a schematic cross-sectional view of another example lubricant source.
Figure 6D:
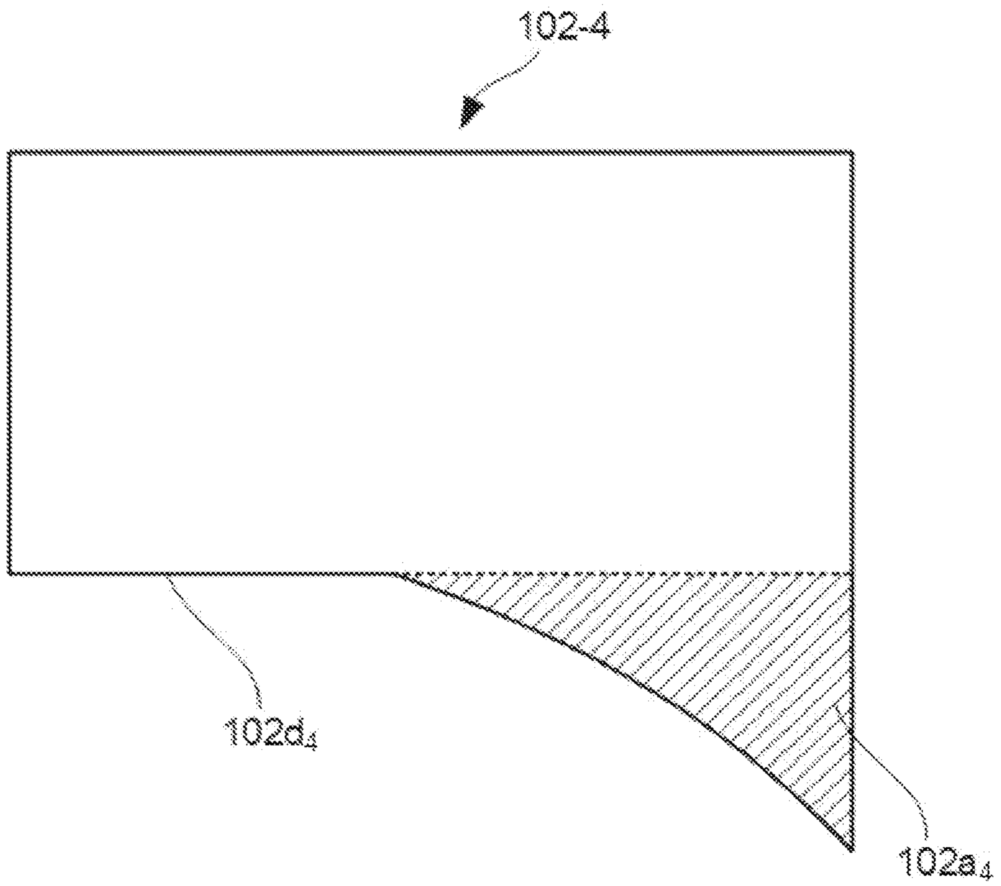
FIG. 6D is a schematic cross-sectional view of another example lubricant source.

FIGS. 6A to 6D are cross-sectional views schematically showing various shapes of the lubricant source 102 according to examples. In FIG. 6A, a lubricant source 102-1 is in the shape of a concave pentagon having regions $\mathbf{102}_{a1}$ and $\mathbf{102}_{b1}$ which have a triangular shape. In this case, a portion to contact the supply roller 101 can be planar. In FIG. 6B, a lubricant source 102-2 is in the shape of a concave hexagon having regions $\mathbf{102}_{a2}$ and $\mathbf{102}_{b2}$ which have a triangular shape, and a planar portion $\mathbf{102}_{d2}$ between the regions $\mathbf{102}_{a2}$ and $\mathbf{102}_{b2}$. In FIG. 6C, a lubricant source 102-3 is in the shape of a pentagon of a state similar to the shape illustrated in FIG. 6B but without the region $\mathbf{102}_{b2}$, and a planar portion $\mathbf{102}_{d3}$ is extended to an end of the lubricant source 102-3. In FIG. 6D, in a lubricant source 102-4, the region $\mathbf{102}_{a3}$ in the lubricant source 102-3 shown in FIG. 6C is modified into a region $\mathbf{102}_{a4}$ including an arcuate surface at least partially conforming to the outer circumference of the supply roller 101. Note that various shapes other than those shown in FIGS. 6A to 6D are possible. Various shapes of the lubricant source 102 can be formed by preparing a mold having one of the cross sections shown in FIGS. 5A and 6A to 6D, for example, and by charging the mold with a powder of a higher fatty acid metal salt such as zinc stearate or the like that is heated and melted at about 150° C., to be cooled and solidified in the mold.

Figure 7A:
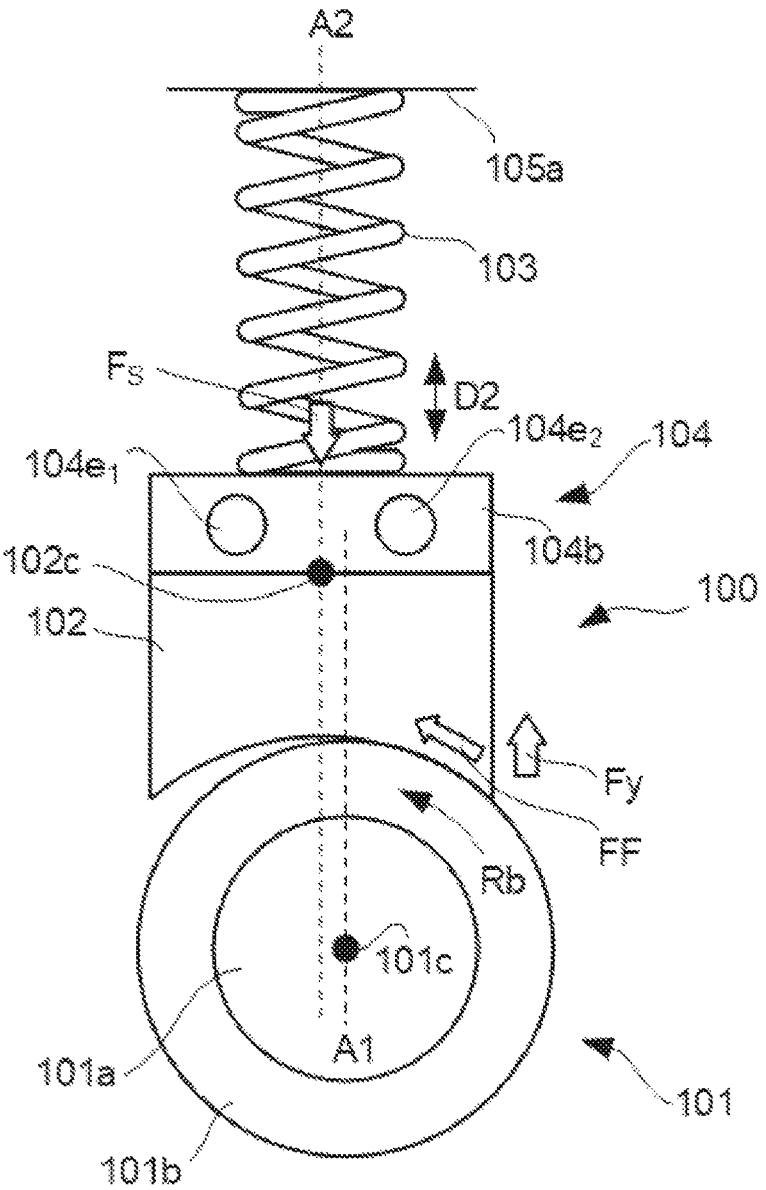
FIG. 7A is a schematic diagram of the example lubricant applying device of FIG. 5A, illustrating vectors of forces.
Figure 7B:
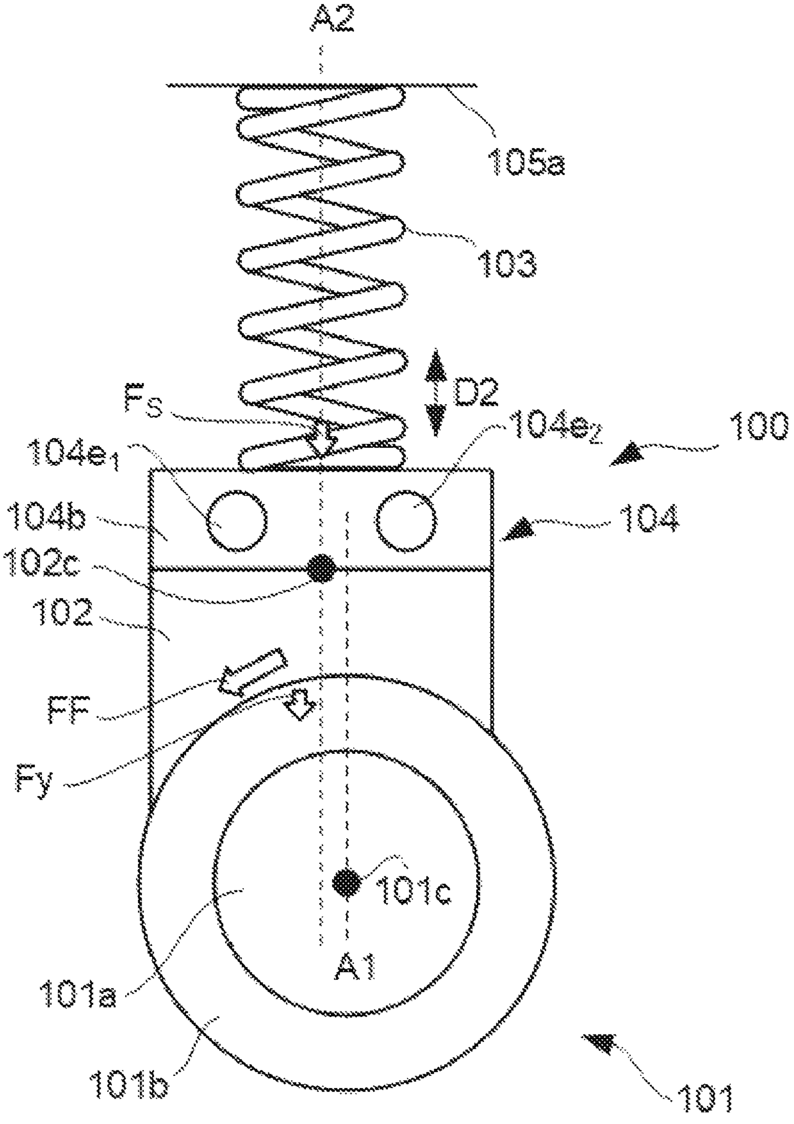
FIG. 7B is a schematic diagram of the example lubricant applying device of FIG. 5B, illustrating vectors of forces.

FIGS. 7A and 7B are diagrams similar to FIGS. 5A and 5B, respectively, in which explanatory vectors of forces are additionally illustrated schematically. In FIGS. 7A and 7B, the arrow Fs indicates the urging force of the urging member 103 in the direction D2. The arrow FF indicates a frictional force in the portion where the lubricant source 102 contacts the supply roller 101. The arrow Fy indicates a D2-directional component of the frictional force FF.

With reference to FIG. 7A, the lubricant source 102 in the initial state contacts the supply roller 101 exclusively in the first region 102*a* as mentioned above with reference to FIG. 5A. In such a state, the rotation of the supply roller 101 in the direction of rotation Rb gives rise to the frictional force FF in the contact surface between the lubricant source 102 and the supply roller 101. Since the contact surface is inclined upstream of the line A1, the D2-directional component Fy of the frictional force FF becomes a force which opposes the urging force Fs of the urging member 103. That is, in the initial state, the rotation of the supply roller 101 contacting the first region 102*a* generates a force that opposes the urging by the urging member 103. Accordingly, in the initial state of the lubricant source 102, the urging force of the urging member 103 is weakened by the frictional force generated by the rotation of the supply roller 101.

As the lubricant source 102 is consumed, the inclination of the contact surface between the lubricant source 102 and the supply roller 101 is gradually reduced (i.e., the force which opposes the urging force Fs is gradually weakened). Subsequently, when the second region 102*b* contacts the supply roller 101, the inclination of the contact surface changes to be inclined downstream of the line A1 as shown in FIG. 7B. In this case, the D2-directional component Fy of the frictional force FF becomes a force which aids the urging force Fs of the urging member 103. Namely, a rotation of the supply roller 101 in contact with the second region 102*b* of the lubricant source 102 generates a force that promotes the urging action of the urging member 103. Accordingly, from the vicinity of the line A1 across which the geometric center S1 of the contact area passes as the lubricant source 102 is consumed, the urging force of the urging member 103 is gradually increased.

As mentioned above with reference to FIGS. 7A and 7B, the frictional force in the contact portion between the lubricant source 102 and the supply roller 101 is put to use. Therefore, in order to compensate for a reduction in the applying amount of the lubricant due to the urging force Fs which decreases as the lubricant source is consumed, the coefficient of friction may be suitably selected to set the friction to be produced between the lubricant source 102 and the supply roller 101. For example, for a lubricant source having a low coefficient of friction, the supply roller 101 may be selected to have a relatively high coefficient of friction. For example, a sponge-like elastic body (foam) having a substantially high coefficient of friction may be selected as the elastic body 101*b* of the supply roller 101, rather than a brush-like elastic body. In addition, the coefficient of friction can be suitably set by adjusting the density of the foam and the 25% hardness of the foam.

As mentioned above, the urging force of the compression coil spring tends to reach a maximum in the initial state of the lubricant source and the urging force thereof tends to weaken as the lubricant source is consumed and the compression coil spring is stretched. According to some examples, in the initial state of the lubricant source 102, a rotation of the supply roller 101 generates a force that acts to oppose (counters) the urging action of the urging member 103, and as the lubricant source 102 is consumed, the force gradually changes into a force that acts to aid (promotes) the urging action of the urging member 103. Accordingly, a substantially constant force pressing the lubricant source 102 against the supply roller 101 may be achieved from the initial state of the lubricant source through to a state in which the lubricant source is exhausted, in order to stabilize the lubricant consumption rate of the lubricant source 102, and consequently extend the life of the lubricant of the lubricant source. Additionally, in the example image forming apparatus including such a lubricant applying device 100, the lifespan of the photosensitive drum to be coated is prolonged, and the quality of printed images may be kept substantially constant (stabilized), by applying a substantially constant amount of the lubricant to the photosensitive drum.

TEST EXAMPLES

Figure 8:
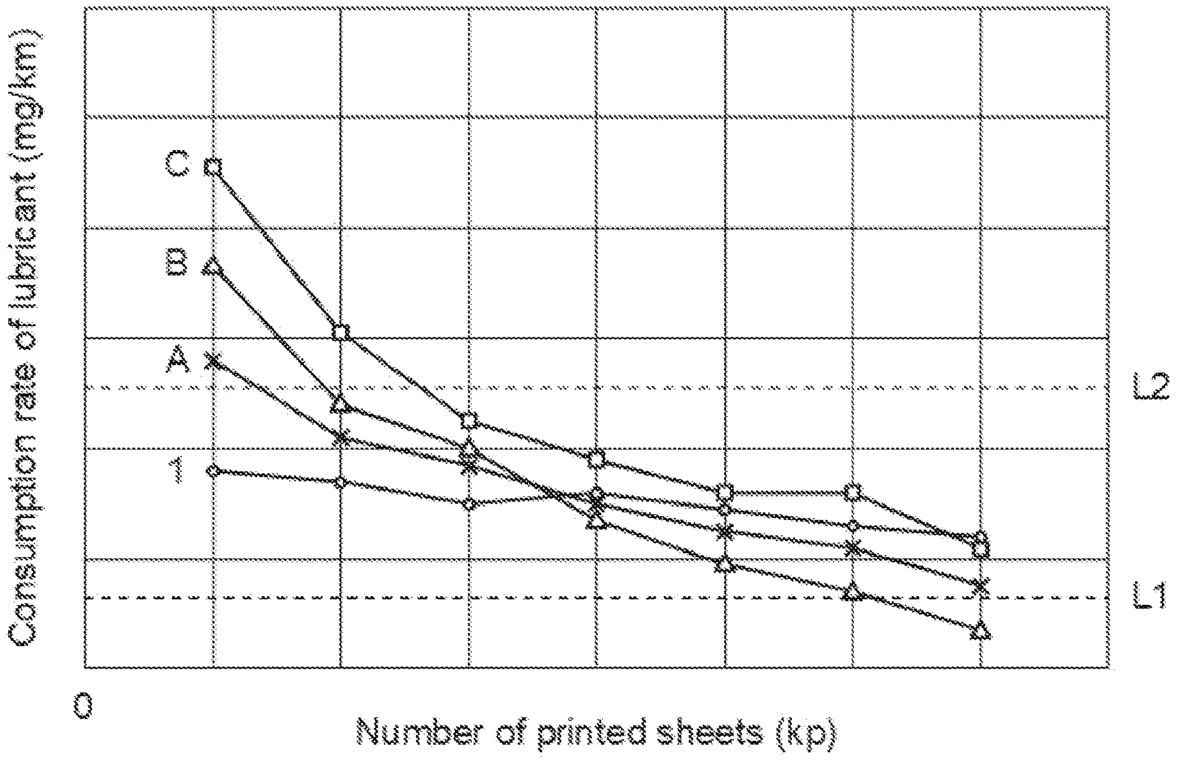
FIG. 8 is a graph of a lubricant consumption rate relative to a number of printed sheets according to one example.

In the lubricant applying device 100 shown in FIG. 5A, the shape of the contact surface of the lubricant source 102, the distance G between the lines A2 and A1, the direction in which the center 102*c* of the lubricant source 102 was offset when the lubricant source 102 was arranged, and the like were changed, thereby experimentally determining the lubricant consumption rate relative to the number of printed sheets as Example 1 and Examples A, B and C. A graph of the result is shown in FIG. 8. The conditions of these experiments are schematically shown in Table 1. As shown in Table 1, items other than "contact surface shape of lubricant source" and "position of line A2 relative to line A1" are common to Example 1 and Examples A, B and C.

TABLE 1

| | Example 1 | Example A | Example B | Example C |
|---|---|---|---|---|
| Spring constant of compression coil spring (Kg/m) | 1.6 | 1.6 | 1.6 | 1.6 |
| Free lengh of spring (mm) | 10 | 10 | 10 | 10 |
| Initial use length of spring (mm) | 4 | 4 | 4 | 4 |
| Contact surface shape of lubricant source | R shape | Planar | R shape | R shape |
| Position of line A2 relative to line A1 | 1 mm to downstream side | 1 mm to downstream side | 0 mm | 1 mm to upstream side |
| Elastic body of supply roller | Sponge | Sponge | Sponge | Sponge |
| Outer diameter of supply roller (mm) | 10 | 10 | 10 | 10 |

Example 1 is a case where, as shown in FIG. 5A, the lubricant source 102 is provided with the first and second regions 102*a* and 102*b*, the shape of the contact surface with the supply roller 101 is a so-called R shape, the center 102*c* of the lubricant source 102 (the line A2 extending through the center 102*c*) is offset downstream in the direction of rotation Rb of the supply roller 101 relative to the line A1 extending through the rotation axis 101*c* of the supply roller 101, and the distance G between the lines A1 and A2 is 1 mm. Example A is similar to Example 1, except that the lubricant source 102 is not provided with the first and second regions 102*a* and 102*b* and the shape of the contact surface of the lubricant source 102 is planar. In Examples B and C, the shape of the contact surface of the lubricant source 102 with the supply roller 101 is a so-called R shape and is the same as that of the aforementioned Example 1. However, in Example B, the distance G between the lines A1 and A2 is 0 mm and the line A1 conforms to the line A2. In addition, in Example C, the center 102*c* of the lubricant source 102 (the line A2) is offset upstream relative to the line A1 in the direction of rotation Rb of the supply roller 101 in contrast with the aforementioned Example 1 and the distance G between the lines A1 and A2 is 1 mm.

Referring to FIG. 8, the lubricant consumption rates for the aforementioned Example 1 and Examples A, B and C are plotted relative to the number of printed sheets. The graph of FIG. 8 indicates that the number of printed sheets increases toward the right side and the lubricant consumption rate increases upwardly. In addition, a dashed line L2 indicates a lower limit at which filming may occur on the surface of the photosensitive drum, and a dashed line L1 indicates an upper limit at which a wearing of the photosensitive drum may occur.

As shown in the graph of FIG. 8, while the consumption rate of the lubricant decreases as the total number of printed sheets increases in the plots of Example 1 and of Examples A, B and C, the degree of decrease is lowest in Example 1. In addition, the plot line of Example 1 is located between the dashed lines L1 and L2 and is an almost constant straight line, such that the consumption rate of lubricant is substantially constant as the number of printed sheets increases. Accordingly, it was experimentally verified that such a lubricant applying device according to Example 1 maintained a substantially constant lubricant consumption rate. Examples A, B and C show greater variations in the consumption rate of the lubricant as compared to Example 1. Moreover, the plot lines of Examples A, B and C extend beyond the limits of the dashed lines L1 and L2, and therefore Examples A, B and C may apply an excessive amount of the lubricant to the photosensitive drum or the like particularly at the start of use of the lubricant source. In addition, according to Example B, an amount of the lubricant to be applied to the photosensitive drum or the like may be too low, around the end of the life of the lubricant source.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:

1. A lubricant applying device comprising:

a rotatable applicator to apply lubricant to a member to be coated;

a solid lubricant source having a contact surface to contact the applicator to supply the lubricant to the applicator;

an urging member to urge the lubricant source to contact the applicator; and a guide member to restrict an urging of the lubricant source along a displacement direction, wherein the contact surface of the lubricant source includes a contact area having an arcuate shape at least partially conforming to an outer circumference of the applicator, and wherein, in a transverse cross-section of the lubricant applying device that is taken orthogonally to a rotation axis of the applicator, the contact area of the lubricant source has a geometric center, the geometric center of the contact area of the lubricant source to move along the rotational direction of the applicator from an upstream side of a reference line that extends from the contact surface of the lubricant source to the rotation axis of the applicator in a direction parallel to the displacement direction of the guide member to a downstream side of the reference line based on the lubricant source being consumed.

2. The lubricant applying device according to claim 1, comprising:

a support member to support the lubricant source, wherein the urging member is to urge the support member to maintain the lubricant source in contact with the applicator.

3. The lubricant applying device according to claim 1, wherein a widthwise center of the lubricant source includes a centerpoint of the contact surface in a widthwise direction of the lubricant source, in the transverse cross-section.

4. The lubricant applying device according to claim 1, wherein, in the transverse cross-section, the lubricant source has a width that is substantially orthogonal to the displacement direction, wherein a widthwise center of the lubricant source is offset to a downstream side of the reference line in the rotational direction of the applicator, and wherein the contact area is in contact with the applicator and is to increase based on the lubricant source being consumed.

5. The lubricant applying device according to claim 4, wherein a rotation of the applicator is to apply a force to the lubricant source in a direction opposite to an urging force of the urging member based on the contact area of the lubricant source that contacts the applicator being substantially located on the upstream side of the reference line in the rotational direction of the applicator.

6. The lubricant applying device according to claim 1, wherein the contact surface of the lubricant source includes a first region and a second region to contact the applicator, and wherein the first region is located substantially on the upstream side of the reference line in the rotational direction of the applicator in the transverse cross-section.

7. The lubricant applying device according to claim 6, wherein, in the transverse cross-section, the second region is located on a downstream side of the reference line, in the rotational direction of the applicator.

8. The lubricant applying device according to claim 6, wherein the second region includes an arcuate surface at least partially conforming to an outer circumference of the applicator.

9. The lubricant applying device according to claim 6, wherein a rotation of the applicator is to urge the lubricant source in an urging direction of the urging member based on the applicator contacting a substantial portion of the second region.

10. The lubricant applying device according to claim 1, wherein the applicator comprises an elastic sponge body to contact the lubricant source.

11. The lubricant applying device according to claim 1, wherein, in the transverse cross-section, a width of the lubricant source is less than a diameter of the applicator.

12. An image forming apparatus comprising:

a member to be coated;

a lubricant applying device comprising:

a rotatable applicator to apply lubricant to the member to be coated; and a solid lubricant source having a contact surface that faces the applicator, wherein the contact surface includes a contact area that is in contact with the applicator to supply the lubricant to the applicator, and wherein the contact area has a geometric center in a transverse cross section of the lubricant applying device that is taken orthogonally to a rotation axis of the applicator, the geometric center to move along a rotational direction of the applicator based on the lubricant source being consumed;

an urging member to urge the lubricant source to contact the applicator; and a guide member to guide the lubricant source in an urging direction of the urging member, wherein a reference line extends from the contact surface of the lubricant source to the rotation axis of the applicator and parallel to the urging direction of the urging member in the transverse cross section, the geometric center of the contact area of the lubricant source to move from an upstream side of the reference line to a downstream side of the reference line based on the lubricant source being consumed by a rotation of the applicator.

13. The image forming apparatus according to claim 12, wherein, in the transverse cross section, a widthwise center of the lubricant source is offset to a downstream side of the reference line, in the rotational direction of the applicator.

14. The image forming apparatus according to claim 12, wherein the rotation of the applicator is to apply a force to the lubricant source in a direction opposite to the urging direction of the urging member based on the geometric center of the contact area of the lubricant source being located on the upstream side of the reference line, and wherein the rotation of the applicator is to urge the lubricant source in the urging direction of the urging member based on the geometric center of the contact area being located on the downstream side of the reference line.

* * * * *